United States Patent
Kaarto et al.

(10) Patent No.: US 8,378,045 B2
(45) Date of Patent: *Feb. 19, 2013

(54) THERMOFORMED ARTICLE WITH HIGH STIFFNESS AND GOOD OPTICS

(75) Inventors: John Kaarto, Missouri City, TX (US); Linfeng Chen, Missouri City, TX (US); Tak W. Leung, Houston, TX (US)

(73) Assignee: Dow Global Technologies LLC, Midland, MI (US)

(*) Notice: Subject to any disclaimer, the term of this patent is extended or adjusted under 35 U.S.C. 154(b) by 222 days.

This patent is subject to a terminal disclaimer.

(21) Appl. No.: 12/819,489

(22) Filed: Jun. 21, 2010

(65) Prior Publication Data

US 2010/0301059 A1    Dec. 2, 2010

Related U.S. Application Data

(63) Continuation-in-part of application No. 12/650,617, filed on Dec. 31, 2009, now Pat. No. 8,263,692.

(60) Provisional application No. 61/141,902, filed on Dec. 31, 2008, provisional application No. 61/141,959, filed on Dec. 31, 2008.

(51) Int. Cl.
*C08F 2/00* (2006.01)
*C08F 4/02* (2006.01)
*C08F 110/06* (2006.01)

(52) U.S. Cl. .................. 526/213; 502/127; 502/351
(58) Field of Classification Search .............. 502/126, 502/127; 526/351

See application file for complete search history.

(56) References Cited

U.S. PATENT DOCUMENTS

| 5,015,612 A * | 5/1991 | Kioka et al. ............... 502/133 |
| 6,534,574 B1 * | 3/2003 | Zhao et al. ................. 524/284 |
| 2005/0239636 A1 * | 10/2005 | Gao et al. ................... 502/103 |
| 2009/0203863 A1 | 8/2009 | Chen et al. |
| 2010/0168353 A1 | 7/2010 | Sheard et al. |
| 2010/0301059 A1 | 12/2010 | Kaarto et al. |

FOREIGN PATENT DOCUMENTS

| WO | 01/58767 A1 | 8/2001 |
| WO | 03068828 A1 | 8/2003 |
| WO | 2010078479 A1 | 7/2010 |
| WO | 2010078480 A1 | 7/2010 |
| WO | 2010078485 A1 | 7/2010 |

* cited by examiner

*Primary Examiner* — David W Wu
*Assistant Examiner* — Elizabeth Eng
(74) *Attorney, Agent, or Firm* — Whyte Hirschboeck Dudek SC

(57) ABSTRACT

Disclosed are thermoformed articles composed of propylene homopolymer containing a substituted phenylene aromatic diester. The thermoformed articles have high stiffness, good compression strength, excellent processability, and excellent optics.

20 Claims, 3 Drawing Sheets

THERMOFORMED ARTICLE WITH HIGH STIFFNESS AND GOOD OPTICS

PRIORITY CLAIM

This application claims priority to U.S. patent application Ser. No. 12/650,617 filed on Dec. 31, 2009, which claims priority to U.S. provisional patent application Ser. No. 61/141,902 filed on Dec. 31, 2008, and U.S. provisional patent application Ser. No. 61/141,959 filed on Dec. 31, 2008, the entire content of each application incorporated by reference herein.

BACKGROUND

The present disclosure is directed to compositions and articles containing a propylene-based polymer and processes for producing the same.

Worldwide demand for propylene-based polymers continues to grow as applications for these polymers become more diverse and more sophisticated. Known are Ziegler-Natta catalyst compositions for the production of olefin-based polymers. Ziegler-Natta catalyst compositions typically include a procatalyst containing a transition metal halide (i.e., titanium, chromium, vanadium), a cocatalyst such as an organoaluminum compound, and optionally an external electron donor. Given the perennial emergence of new applications for propylene-based polymers, the art recognizes the need for propylene-based polymers with improved and varied properties.

Desirable would be a propylene-based polymer with processability suitable for thermoforming operations, the propylene-based polymer having good optical properties and high stiffness.

SUMMARY

The present disclosure is directed to propylene-based thermoformed articles and processes for producing the same. The propylene-based compositions are produced with a catalyst composition that contains a substituted phenylene aromatic diester. Provision of the substituted phenylene aromatic diester provides a propylene-based polymer with improved stiffness and improved optical properties when thermoformed.

The present disclosure provides an article. In an embodiment, a thermoformed article is provided and includes a propylene homopolymer. The propylene homopolymer contains a substituted phenylene aromatic diester. The thermoformed article has a haze value from about 1% to about 10% as measured in accordance with ASTM D 1003.

The present disclosure provides a cup. In an embodiment, a thermoformed cup is provided and includes a sidewall composed of a propylene homopolymer. The propylene homopolymer contains a substituted phenylene aromatic diester. The sidewall has a thickness from about 5 mils to about 15 mils. The sidewall has a haze value from about 1% to about 10% as measured in accordance with ASTM D 1003.

The present disclosure provides a cup. In an embodiment, a thermoformed cup is provided and includes a sidewall composed of a nucleated propylene homopolymer. The nucleated propylene homopolymer contains a substituted phenylene aromatic diester.

An advantage of the present disclosure is an improved thermoformed article.

An advantage of the present disclosure is a thermoformed container with improved stiffness, improved sidewall compression strength, and excellent optical properties (low haze).

An advantage of the present disclosure is a thermoformed cup with improved topload compression strength and/or improved sidewall compression strength with improved optics (low haze) and good processability.

An advantage of the present disclosure is the provision of a phthalate-free thermoformed article.

An advantage of the present disclosure is the provision of a phthalate-free thermoformed cup made from a propylene homopolymer and suitable for food contact applications.

DETAILED DESCRIPTION

Figure 1:
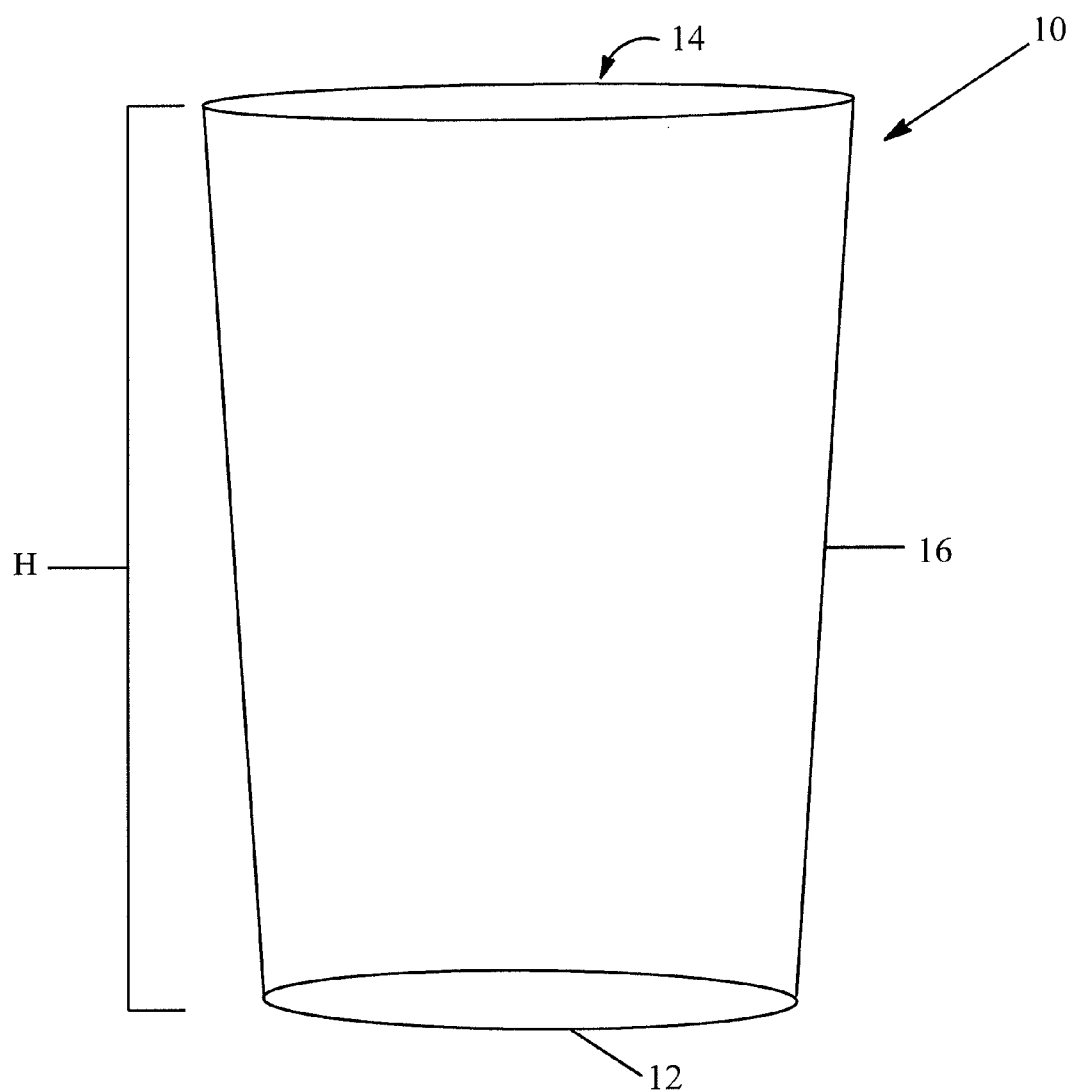
FIG. 1 is a perspective view of a thermoformed article in accordance with an embodiment of the present disclosure.

The present disclosure provides an article. The article is a molded article. Nonlimiting examples of molded articles include an injected molded article, an extruded article, a thermoformed article, and a blow molded article. Nonlimiting examples of suitable articles include film (cast film and/or blown film), fiber (continuous filaments, spunbond filaments, melt flown filaments and stretched filaments), pipe, tubing, cable, sheet, cups, pails, bottles, containers, boxes, automotive parts, appliances, consumer goods, closures, and lids.

In an embodiment, the article is a thermoformed article. The thermoformed article is composed of a propylene homopolymer. The thermoformed article has a haze value from about 1% to about 10% as measured in accordance with ASTM D 1003. In a further embodiment, the thermoformed article is a container.

A "thermoformed article," as used herein, is a thermoplastic sheet heated at least to its softening point and fitted along the contours of a mold with pressure (positive and/or negative). The thermoformed article then is removed from the mold after cooling below its softening point. Nonlimiting examples of thermoformed articles include trays, containers, and cups.

A nonlimiting example of a thermoforming process for a container begins with a sheet or a film of thermoplastic material. The sheet is typically produced using an extruder, sheet die, and three-roll stack of chill rolls. The sheet may wound into a roll or cut into lengths to be fed later into a thermoformer. The sheet can also be directly fed in-line into a thermoformer. In the thermoformer the thermoplastic sheet is heated in an oven to a temperature suitable for thermoforming, i.e., this temperature may be below, at, or above the melting point of the thermoplastic material depending on the process used. The heated sheet/film is then fed (indexed) into a mold cavity and formed into an article under conditions using vacuum and/or pressure and optionally mechanical (plug) assist. The mold cavity imparts the shape of the container as the plastic material is drawn into the mold and the mold also cools the material to a temperature significantly below the melting point so that the article has solidified adequately to retain its shape upon removal from the mold. The processing time for a thermoforming operation is typically between 3 and 10 seconds for an article such as a cup, but may be faster for smaller/thinner articles, or longer for thick sheet thermoforming. Further descriptions of thermoforming polypropylene can be found in the book: "*Polypropylene, The Definitive User's Guide and Databook*" by Maier and Calafut, published by Plastics Design Library, 1998.

In an embodiment, the present thermoformed article is composed of a propylene homopolymer. The propylene homopolymer contains a substituted phenylene aromatic diester (or "SPAD", or "SPAD-containing propylene homopolymer"). The presence of the substituted phenylene aromatic diester in the propylene homopolymer is the result of polymerization by way of a unique catalyst composition. The catalyst composition used to make the present propylene homopolymer includes (i) a procatalyst composition that is a combination (or a reaction product) of a magnesium moiety, a titanium moiety and an internal electron donor, and (ii) a cocatalyst. The internal electron donor includes a substituted phenylene aromatic diester. The catalyst composition optionally includes an external electron donor, and optionally an activity limiting agent. Such catalyst compositions and propylene-based polymers made therefrom are disclosed in U.S. patent application Ser. No. 12/650,834, filed on Dec. 31, 2009, U.S. patent application Ser. No. 12/651,268, filed on Dec. 31, 2009, and U.S. patent application Ser. No. 12/650,617, filed on Dec. 31, 2009, the entire content of each application incorporated by reference herein.

The thermoplastic article contains from about 0.1 ppm to about 100 ppm of the substituted phenylene aromatic diester. In an embodiment, the substituted phenylene aromatic diester is a substituted 1,2 phenylene dibenzoate. The substituted 1,2-phenylene aromatic diester has the structure (I) below:

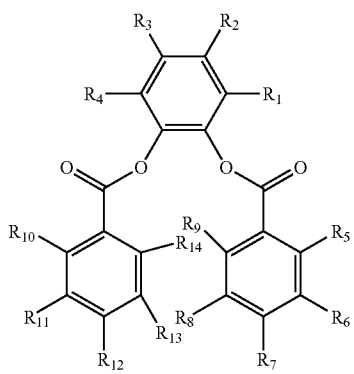

(I)

wherein $R_1$-$R_{14}$ are the same or different. Each of $R_1$-$R_{14}$ is selected from a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one of $R_1$-$R_{14}$ is not hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Nonlimiting examples of heteroatoms include: halogens (F Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon chain.

Nonlimiting examples of suitable substituted 1,2-phenylene aromatic diester that may be present in the propylene homopolymer are set forth in Table 1 below.

TABLE 1

| Compound | Structure |
|---|---|
| 3-methyl-5-tert-butyl-1,2-phenylene dibenzoate | |
| 3,5-diisopropyl-1,2-phenylene dibenzoate | |

TABLE 1-continued
| Compound | Structure |
|---|---|
| 3,6-dimethyl-1,2-phenylene dibenzoate | 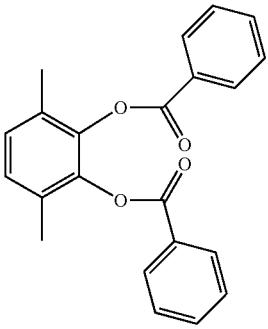 [SMILES: Cc1ccc(C)c(OC(=O)c2ccccc2)c1OC(=O)c1ccccc1] |
| 4-t-butyl-1,2-phenylene dibenzoate | 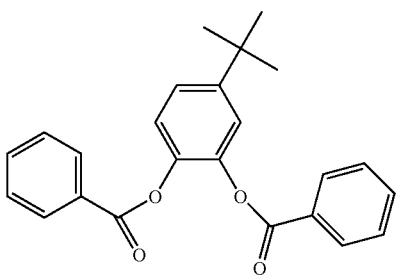 [SMILES: CC(C)(C)c1ccc(OC(=O)c2ccccc2)c(OC(=O)c2ccccc2)c1] |
| 4-methyl 1,2-phenylene dibenzoate | 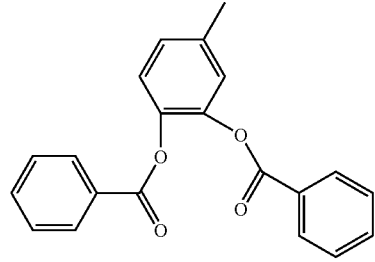 [SMILES: Cc1ccc(OC(=O)c2ccccc2)c(OC(=O)c2ccccc2)c1] |
| 1,2-naphthalene dibenzoate | 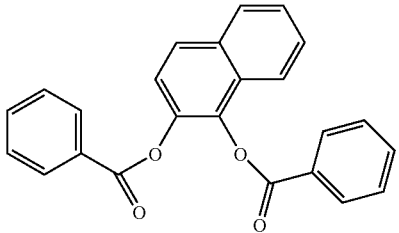 [SMILES: O=C(Oc1ccc2ccccc2c1OC(=O)c1ccccc1)c1ccccc1] |
| 2,3-naphthalene dibenzoate | 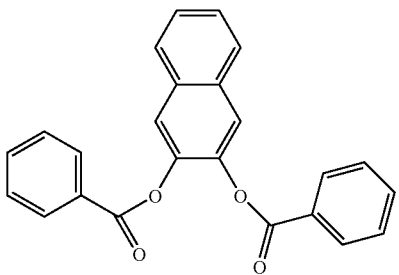 [SMILES: O=C(Oc1cc2ccccc2cc1OC(=O)c1ccccc1)c1ccccc1] |

TABLE 1-continued

| Compound | Structure |
|---|---|
| 3-methyl-5-tert-butyl-1,2-phenylene di(4-methylbenzoate) | |
| 3-methyl-5-tert-butyl-1,2-phenylene di(2,4,6-trimethylbenzoate) | |
| 3-methyl-5-tert-butyl-1,2-phenylene di(4-fluorobenzoate) | |
| 3-methyl-5-tert-butyl-1,2-phenylene di(4-chlorobenzoate) | |

In an embodiment, the substituted phenylene aromatic diester that is present in the propylene homopolymer is selected from substituted 1,2 phenylene dibenzoate, 3-methyl-5-tert butyl-1,2 phenylene dibenzoate, and 3,5-diisopropyl-1,2 phenylene dibenzoate. In a further embodiment, the thermoformed article contains 3-methyl-5-tert butyl-1,2 phenylene dibenzoate.

In an embodiment, the thermoformed article composed of the SPAD-containing propylene homopolymer has a haze value from about 1% to about 10%, or from about 1% to about 6%, or from 4% to 6% as measured in accordance with ASTM D 1003 (measured on thermoformed plaques).

In an embodiment, the propylene homopolymer has a flexural modulus from about 260 kpsi to about 370 kpsi, or about 270 kpsi as measured in accordance with ASTM D 790.

In an embodiment, the SPAD-containing propylene homopolymer has a melt flow rate (MFR) from 0.1 g/10 min to 20 g/10 min, or from about 0.3 g/10 min to about 5.0 g/10 min, or from about 1.5 g/10 min to about 4.0 g/10 min.

In an embodiment, the SPAD-containing propylene homopolymer has a xylene solubles content from 0.5 wt % to 5 wt %, or from 1.0 wt % to 4 wt %, or from 1.5 wt % to 3.5 wt %, or from 2 wt % to 3 wt %. Weight percent is based on total weight of the propylene homopolymer.

In an embodiment, the SPAD-containing propylene homopolymer has a polydispersity index (PDI) from about 4.0 to about 10.0, or greater than 5.0 to about 10.0, or greater than 5.0 to about 8.0, or from about 5.0 to about 6.0.

In an embodiment, the SPAD-containing propylene homopolymer is a nucleated propylene homopolymer. As used herein, "nucleation" is the process by which compounds and compositions are used to produce faster crystallization and/or higher polymer crystallization temperatures. Nucleation is a post-reactor procedure whereby a nucleating agent is blended (typically melt blended) with the propylene-based polymer. As used herein, "nucleating agents" are compounds utilized to provide nucleation sites for crystal growth during cooling of a polyolefin molten formulation. Nucleating agents increase the rate at which nucleation events occur, often enabling significant crystallization at temperatures higher than possible in the absence of such an agent. Nucleation increases polymer stiffness. A "nucleated propylene-based polymer" is a polymer that has been subjected to nucleation. Bounded by no particular theory, it is believed that nucleation improves the optical properties of propylene homopolymer compared to propylene homopolymer devoid of a nucleating agent.

Nonlimiting examples of suitable nucleating agents include 1,3-O-2,4-bis(3,4-dimethylbenzylidene) sorbitol (hereinafter DMDBS), available from Milliken Chemical under the trade name Millad® 3988, sodium benzoate, sodium 2,2'-methylene-bis-(4,6-di-tert-butylphenyl) phosphate (from Asahi Denka Kogyo K.K., known as NA-11), aluminum bis[2,2'-methylene-bis-(4,6-di-tert-butylphenyl) phosphate] (also from Asahi Denka Kogyo K.K., known as NA-21), talc, and the like.

In an embodiment, the nucleated propylene-based polymer has a haze value that is at least 10% less than the haze value of the SPAD-containing propylene homopolymer without the nucleating agent. In an embodiment, the nucleating agent is NA-11.

The present disclosure provides a thermoformed cup. In an embodiment, a thermoformed cup 10 is provided and includes a closed bottom wall 12, an open top 14 at an opposite end of the closed bottom wall 12 as shown in FIG. 1. A sidewall 16 extends between the closed bottom wall 12 and the open top 14 and defines a height H of the thermoformed cup 10. The diameter of the sidewall 16 may be constant or may be variable along height H.

The thermoformed cup 10 may be formed to a volume as desired. Nonlimiting examples of suitable cup volumes range from 59.15 ml (2 ounces) to 709.76 ml (24 ounces), or 946.35 ml (32 ounces) or even 1892.71 ml (64 ounces) and any value therebetween. The cup 10 has a mass from 5 grams to 25 grams. In an embodiment, the cup 10 is a 591.47 ml (20 ounce) cup with a mass of 11 grams.

In an embodiment, the cup 10 has a height H of 146 mm (5¾ inches), the bottom wall 12 with a length of 58.7 mm (2 5/16 inches), an open top 14 with a length of 98.4 mm (3⅞ inches), and a sidewall 16 with a length of 112.7 mm (4 7/16 inches).

The sidewall 16 has a thickness from about 127 microns (5 mils) to about 381 microns (15 mils) or 178 microns (7 mils) to 254 microns (10 mils). The sidewall 16 has a haze value from about 1% to about 10%, or from about 1% to about 6%, or from 4% to 6%. The sidewall 16 has a sidewall compression value of 16.7 N (3.75 lbf) to 17.1 N (3.85 lbf), or 16.8 N (3.77 lbf).

In an embodiment, the thermoformed cup 10 is composed of any SPAD-containing propylene homopolymer as disclosed above.

In an embodiment, the thermoformed cup is composed of a nucleated SPAD-containing propylene homopolymer.

In an embodiment, the 591.47 ml (20 ounce), 11 gram thermoformed cup as described has a topload compression strength from 311.4 N (70 lbf) to 333.6 N (75 lbf) or 320.3 N (72 lbf).

Applicant surprisingly discovered that propylene homopolymer containing a substituted phenylene aromatic diester unexpectedly provides thermoformed articles, and thermoformed containers in particular, with the desirable combination of high stiffness and excellent optics (haze 1%-6%). The present SPAD-containing propylene homopolymer also has a PDI (5.0-10.0) suitable for thermoforming applications.

Typically an α-olefin comonomer (such as ethylene) is required to provide a propylene-based polymer with low haze. Applicant has unexpectedly discovered that thermoformed articles with high stiffness and low haze can be obtained with a propylene homopolymer by way of the SPAD-containing propylene homopolymer. Unexpectedly, propylene homopolymer made with the SPAD-containing catalyst exhibits a lower haze value (about 18% lower) than propylene/ethylene copolymer made with the same SPAD-containing catalyst (compare S1 and S2 in Table 3).

The present SPAD-containing propylene homopolymer thereby increases production efficiency by lowering the cost of starting material by avoiding the need for more expensive propylene/α-olefin copolymer, and the avoidance of propylene/ethylene copolymer in particular.

The present disclosure provides another cup. In an embodiment, a thermoformed cup is provided and includes a nucleated propylene homopolymer, the nucleated propylene homopolymer contains a substituted phenylene aromatic diester. The sidewall of the cup has a thickness from about 5 mils to about 15 mils and a haze value from about 1% to about 10% as disclosed above.

In an embodiment, any of the foregoing thermoformed articles is phthalate-free or is otherwise void or devoid of phthalate and/or phthalate derivatives.

In an embodiment, any of the foregoing thermoformed articles is suitable for food-contact applications.

Any of the foregoing thermoformed articles may include one or more of the following additives: antioxidants, antistatics, antacid, stabilizers, lubricants, mold release agents, ultraviolet absorbers/stabilizers, dyes, pigments, antifungals, antimicrobial agents, processing aids, waxes, slip agents, and any combination of the foregoing.

The present thermoformed article, thermoformed container and/or thermoformed cups may comprise two or more embodiments disclosed herein.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, 2-propenyl (or allyl), vinyl, n-butyl, t-butyl, i-butyl (or 2-methylpropyl), etc. The alkyls have 1 and 20 carbon atoms.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have 1 and 20 carbon atoms.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term, "propylene-based polymer," as used herein, refers to a polymer that comprises a majority weight percent polymerized propylene monomer (based on the total amount of polymerizable monomers), and optionally may comprise at least one polymerized comonomer.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, and combinations thereof. Suitable substituted alkyls include, for example, benzyl, trifluoromethyl and the like.

Test Methods $^{13}$C NMR characterization (ethylene content) is performed as follows:

Sample Preparation

The samples are prepared by adding approximately 2.7 g of a 50/50 mixture of tetrachloroethane-$d_2$/orthodichlorobenzene containing 0.025 M Cr(AcAc)$_3$ to 0.20 g sample in a Norell 1001-7 10 mm NMR tube. The samples are dissolved and homogenized by heating the tube and its contents to 150° C. using a heating block and heat gun. Each sample is visually inspected to ensure homogeneity.

Data Acquisition Parameters

The data are collected using a Bruker 400 MHz spectrometer equipped with a Bruker Dual DUL high-temperature CryoProbe. The data are acquired using 1280 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 7 minutes prior to data acquisition Flexural modulus is determined in accordance with ASTM D790-00 Method 1, using an ASTM D 638 specimen tested at 1.3 mm/min.

Isotacticity is measured using a Bruker 400 MHz spectrometer equipped with a Bruker Dual DUL high-temperature CryoProbe. The data is acquired using 320 transients per data file, a 6 sec pulse repetition delay (4.7 s delay+1.3 s acq. time), 90 degree flip angles, and inverse gated decoupling with a sample temperature of 120° C. All measurements are made on non-spinning samples in locked mode. Samples are homogenized immediately prior to insertion into the heated (125° C.) NMR Sample changer, and are allowed to thermally equilibrate in the probe for 7 minutes prior to data acquisition. The $^{13}$C NMR chemical shifts are internally referenced to the mmmm isotactic pentad at 21.90 ppm.

Izod impact strength is measured in accordance with ASTM D 256.

Melt flow rate (MFR) is measured in accordance with ASTM D 1238-01 test method at 230° C. with a 2.16 kg weight for propylene-based polymers.

Polydispersity Index (PDI) is measured using a Rheometrics 800 cone and plate rheometer from TA Instruments, operated at 180° C., using the method of Ziechner and Patel, (1981) "A Comprehensive Study of Polypropylene Melt Rheology" Proc. of the $2^{nd}$ World Congress of Chemical Eng., Montreal, Canada. In this method the cross-over modulus is determined, and the PDI defined as 100,000/cross-over modulus (in Pascals).

Sidewall compression strength is measured on 591.47 ml (20 ounce) thermoformed cups with sidewall thickness of 178-254 microns (7-10 mil), and a sidewall length of 112.7 mm (4 7/16 inches) using an Instron 5500 with a load cell capable of measuring 0 to 10 pounds of force at 0-1 inch displacement and according to the following procedure.

Figure 2:
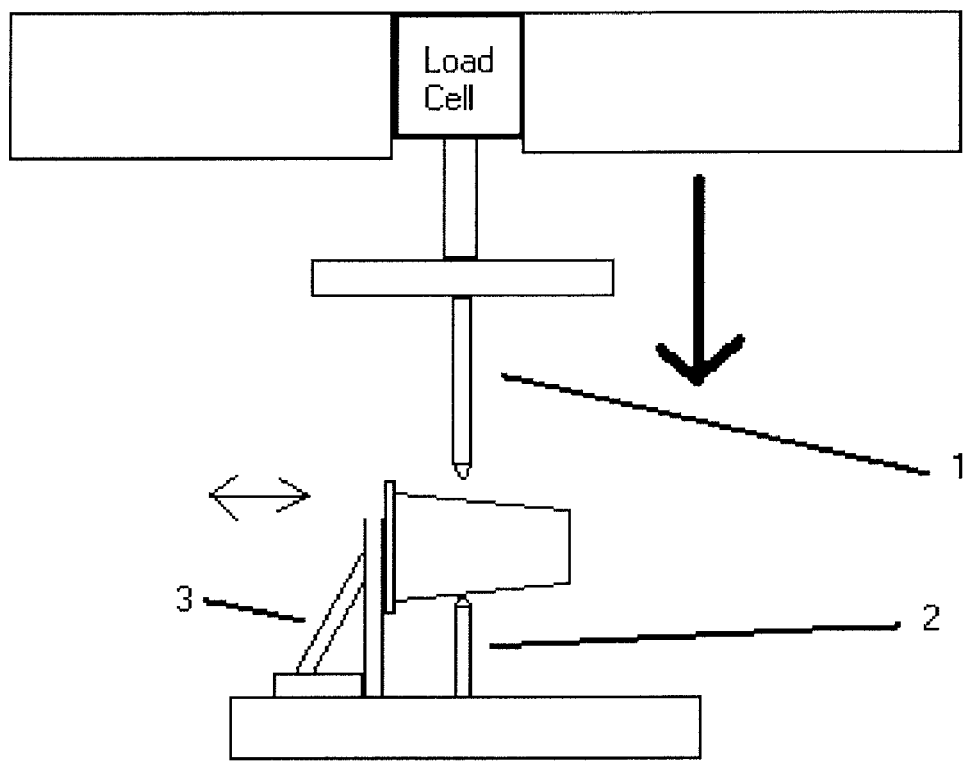
FIG. 2 is a schematic representation of a sidewall compression test device.

Step 1 All tests are run at 22.8° C. (73° F.), 50% humidity.
Step 2 Install the appropriate Instron fixture associated with sidewall compression testing. See FIG. 2.
Step 3 Measure the length of the cup
Step 4 Adjust the cup top support on the lower unit (3) such that the sidewall compression fixture (2) will impact the cup at 1/3 of the cup length. (This simulates typical human clamping location).
Step 5 Adjust the compression fixture using the Instron control unit to lower the fixture within 1/16" of touching the cup.
Step 6 Use Method 19, Sidewall compression within the Instron Series IX program. This sets compression speed to 10 in/min, and specifies a total compression stroke of 2 inches.
Step 7 Load the cup in the sidewall compression fixture so that the cup is flush against the cup top support on the lower unit (3).
Step 8 Click Start Test, and watch to ensure there will be no contact between the support fixture (1) and the compression fixture (2). See FIG. 2. Stop the test immediately if contact is imminent.
Step 9 Remove the sample from the fixture and return the upper fixture to its set position.
Step 10 Repeat steps 8-10 for how many samples are required within the set.
Step 11 Click End Sample to export and print data.
Step 12 The load vs. displacement curve within Instron is used to generate all of the test results. These include displacement at max load, load at 0.25 in., 0.5 in., 1 in., and 2 in.

Topload compression strength is measured on 591.47 ml (20 ounce) thermoformed cups with sidewall thickness of 178-254 microns (7-10 mil), and a sidewall length of 112.7 mm (4 7/16 inches) using an Instron 5500 with a load cell capable of measuring 0 to 100 pounds of force at 0-1 inch displacement and according to the following procedure.

Figure 3:
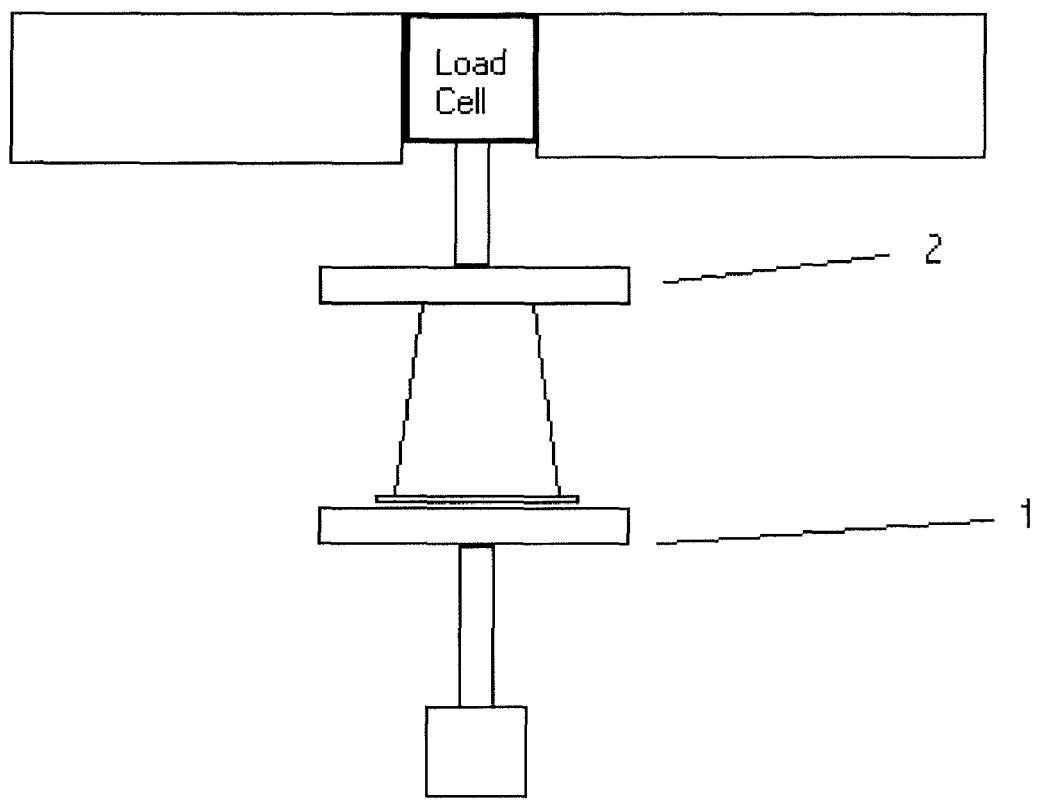
FIG. 3 is a schematic representation of a topload compression test device.

Step 1 All tests are run at 22.8° C. (73° F.), 50% humidity.
Step 2 Install the appropriate Instron fixture associated with top load cup compression. See FIG. 3
Step 3 Use Method 29, "Cup Crush Test", within the Instron Series IX program. This sets compression speed to 5 in/min, and specifies a total compression stroke of 1 inch.
Step 4 Measure the length of the cup.
Step 5 Load the cup between the two compression fixtures.
Step 6 Adjust the compression fixture using the Instron control unit to lower the fixture within 1/16" of touching the cup.
Step 7 Click Start Test, and watch to ensure there will be no contact between the support fixture (1) and the compression fixture (2). See FIG. 3. Stop the test immediately if contact is imminent.
Step 8 Remove the sample from the fixture and return the upper fixture to its set position, by using the return button on the frame controller.
Step 9 Repeat steps 6-9 for how many samples are required within the set.
Step 10 Click End Sample to export and print data.
Step 11 The load vs. displacement curve within Instron is used to generate all of the test results. These include max load, displacement at max load, energy at break, load at 0.5 inches, and load at initial yield.

Xylene Solubles (XS) is measured according to the following procedure: 0.4 g of polymer is dissolved in 20 ml of xylenes with stirring at 130° C. for 30 minutes. The solution is then cooled to 25° C. and after 30 minutes the insoluble polymer fraction is filtered off. The resulting filtrate is analyzed by Flow Injection Polymer Analysis using a Viscotek ViscoGEL H-100-3078 column with THF mobile phase flowing at 1.0 ml/min. The column is coupled to a Viscotek Model 302 Triple Detector Array, with light scattering, viscometer and refractometer detectors operating at 45° C. Instrument calibration was maintained with Viscotek PolyCAL™ polystyrene standards.

By way of example and not by limitation, examples of the present disclosure will now be provided.

EXAMPLES

Five propylene-based polymers (three comparative samples, CS1, CS2, CS3, and two samples, S1-S2) are blended with one or more of the following additives in Table 2.

TABLE 2

| Additive | Abbreviation |
| --- | --- |
| Antacid DHT-4A | DHT-4A |
| Antioxidant Irganox 1010 | 1010 |
| Antioxidant Irganox 168 | 168 |
| Nucleating Agent NA-11 | NA-11 |
| Clarifying Agent NA-21 | NA-21 |
| Calcium Stearate | CaSt |

Properties for each propylene-based polymer are provided in Table 3. Additive amount in Table 3 is in ppm.

Each of the five propylene-based polymers (CS1-CS3 and S1-S2) is thermoformed into a 591.47 ml (20 ounce) cup with a sidewall thickness of 178 microns to 254 microns (7 mil to 10 mil) under the thermoforming conditions as follows.

The cups are produced on an OMV Model F25 thermoforming line equipped with a single cavity 591.47 ml (20 oz.) cup mold. The cycle time for the F25 is about 3 seconds (17-18 strokes/min), mold temperature is 16-20° C. The F25 has a pressure top plug assist and vacuum on the bottom. The extruder is operated at setpoints ramping from 185° C. to 215° C. The adapter, gear pump and zones between the extruder and die are set at 215° C. The 5 zone sheet die is set at 190/205/205/205/190° C. from side to side. The chill rolls are set at 80/90/70° C. for top/middle/bottom and the sheet is fed in an S-down mode. The sheet velocity was 4.1 to 4.2 m/min.

For all runs the sheet temperature in the oven is approximately 165° F. on the surface and estimated at 188-190° F. in the core of the sheet as this is an in-line thermoforming line and residual heat is carried over from the extrusion of the sheet.

The properties of the thermoformed cups are provided in Table 3.

TABLE 3

| Sample No. | Catalyst | | EED | MFR | PDI | XS | Et | DHT4A | 1010 | 168 | NA-11 | NA-21 |
|---|---|---|---|---|---|---|---|---|---|---|---|---|
| CS1 | LER | Basell Avant | C | 1.9 | 3.94 | 3.70 | 0.60 | 300 | 1000 | 1000 | 830 | 0 |
| CS2 | LER | SHAC 320 | D | 3.0 | 4.45 | 1.60 | 0.62 | 0 | 500 | 1000 | 0 | 1300 |
| CS3 | PP | SHAC 320 | D | 2.1 | 4.14 | 0.90 | 0.00 | 350 | 500 | 1000 | 800 | 0 |
| S1 | PP | ZN-SPAD | 4500 | 1.7 | 5.43 | 2.20 | 0.00 | 300 | 1000 | 1000 | 830 | 0 |
| S2 | LER | ZN-SPAD | 4500 | 1.7 | 5.55 | 3.20 | 0.64 | 300 | 1000 | 1000 | 830 | 0 |

| Sample No. | CaSt | Haze | SW | TL | Izod | 1% | Stress | Strain |
|---|---|---|---|---|---|---|---|---|
| CS1 | 0 | 6.10 | 3.02 | 57.25 | 0.97 | 197048 | 5092 | 9.9 |
| CS2 | 600 | 6.89 | 3.75 | 79.00 | 0.4 | 266547 | 5910 | 6.8 |
| CS3 | 0 | 7.40 | 3.86 | 67.45 | 0.59 | 305424 | 5829 | 5.3 |
| S1 | 0 | 5.40 | 3.77 | 71.92 | 0.604 | 279052 | 5928.4 | 5 |
| S2 | 0 | 6.40 | 3.34 | 70.84 | 0.66 | 244684 | 5586 | 7.6 |

1% = 1% secant modulus ASTM D 790 (psi)
4500 = ADT4500 available from The Dow Chemical Company
C = Methylcyclohexyldimethoxysilane
CaSt = Calcium Stearate
D = Dicyclopentyldimethoxysilane
EED = External Electron Donor
Et = ethylene content (wt %)
Haze = ASTM D 1003 (%)
Izod = ASTM D 256A (ft-lb/in)
LER = Low Ethylene Random (minirandom)
MFR = melt flow rate ASTM D 1238 (230 C, 2.16 kg)
PP = Propylene Homopolymer
SHAC 320 is a Ziegler-Natta catalyst available from The Dow Chemical Company
Strain = Tensile Strain @ Yield ASTM D 638 (%)
Stress = Tensile Stress @ Yield ASTM D 638 (psi)
SW = Sidewall compression (lbf)
TL = Topload compression (lbf)
ZN-SPAD = Ziegler Natta catalyst with SPAD (3-methyl-5-tert butyl-1,2 phenylene dibenzoate)

S1 is thermoformed from a propylene homopolymer which contains SPAD, and exhibits an unexpected combination of low haze (less than 6%), good topload compression strength (greater than 70 lbf), and good sidewall compression strength (greater than 3.5 lbf).

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A thermoformed article comprising:
    a propylene homopolymer comprising a substituted 1,2-phenylene dibenzoate selected from the group consisting of 3-methyl-5-tert-butyl-1,2-phenylene dibenzoate and 3,5-diisopropyl-1,2-phenylene-dibenzoate;
    the thermoformed article having a haze value from about 1% to about 10% as measured in accordance with ASTM D 1003.

2. The article of claim 1 wherein the substituted 1,2-phenylene dibenzoate is 3,5-diisopropyl-1,2-phenylene dibenzoate.

3. The article of claim 1 wherein the substituted 1,2-phenylene dibenzoate is 3-methyl-5-tert-butyl-1,2-phenylene dibenzoate.

4. The article of claim 1 wherein the propylene homopolymer is a nucleated propylene homopolymer.

5. The article of claim 4 wherein the nucleated propylene homopolymer has a flexural modulus from about 260 kpsi to about 370 kpsi as measured in accordance with ASTM D 790.

6. The article of claim 1 wherein the propylene homopolymer has a polydispersity index greater than 5.0 to about 10.0.

7. The article of claim 1 wherein the propylene homopolymer has a xylene solubles content from greater than 2% to about 4%.

8. The article of claim 1 wherein the propylene homopolymer has a melt flow rate from about 1.0 g/10 min to about 5.0 g/10 min.

9. The article of claim 1 comprising from about 0.1 ppm to about 100 ppm substituted 1,2 phenylene dibenzoate.

10. The article of claim 1 wherein the article is a container.

11. A thermoformed cup comprising:
    a sidewall composed of a propylene homopolymer comprising a substituted 1,2-phenylene dibenzoate selected from the group consisting of 3-methyl-5-tert-butyl-1,2-phenylene dibenzoate and 3,5-diisopropyl-1,2-phenylene dibenzoate, and having a thickness from about 5 mils to about 15 mils; and
    the sidewall having a haze value from about 1% to about 10% as measured in accordance with ASTM D 1003.

12. The thermoformed cup of claim 11 wherein the propylene homopolymer comprises 3-methyl-5-tert-butyl-1,2-phenylene dibenzoate.

13. The thermoformed cup of claim 11 comprising from about 0.1 ppm to about 100 ppm substituted 1,2-phenylene dibenzoate.

14. The thermoformed cup of claim 11 wherein the propylene homopolymer is a nucleated propylene homopolymer.

15. The thermoformed cup of claim 14 wherein the nucleated propylene homopolymer has a flexural modulus from about 260 kpsi to about 370 kpsi as measured in accordance with ASTM D 790.

16. The thermoformed cup of claim 11 having a topload compression strength of 70 lbf to 75 lbf.

17. The thermoformed cup of claim 11 having a volume of 591 ml (20 ounces).

18. The thermoformed cup of claim 11 wherein the sidewall has a haze value from 4% to 6%.

19. A thermoformed cup comprising:
a sidewall comprising a nucleated propylene homopolymer comprising a substituted 1,2-phenylene dibenzoate selected from the group consisting of 3-methyl-5-tert-butyl-1,2-phenylene dibenzoate and 3,5-diisopropyl-1,2-phenylene dibenzoate.

20. The thermoformed cup of claim 11 wherein the substituted 1,2-phenylene dibenzoate is 3,5-diisopropyl-1,2-phenylene dibenzoate.

* * * * *